(12) United States Patent
Weinberg et al.

(10) Patent No.: US 9,195,961 B1
(45) Date of Patent: Nov. 24, 2015

(54) SYSTEM, METHOD, AND COMPUTER PROGRAM FOR GENERATING CHANNEL SPECIFIC HEURISTICS

(75) Inventors: Mark Weinberg, San Jose, CA (US); Dov Rosner, Kfar Yona (IL)

(73) Assignee: Amdocs Software Systems Limited, Dublin (IE)

( * ) Notice: Subject to any disclaimer, the term of this patent is extended or adjusted under 35 U.S.C. 154(b) by 789 days.

(21) Appl. No.: 12/628,086

(22) Filed: Nov. 30, 2009

(51) Int. Cl.
| G06Q 10/10 | (2012.01) |
| G06Q 10/06 | (2012.01) |
| G06F 17/30 | (2006.01) |
| H04N 21/482 | (2011.01) |
| G06F 3/0484 | (2013.01) |

(52) U.S. Cl.
CPC .......... *G06Q 10/10* (2013.01); *G06Q 10/0633* (2013.01); *G06Q 10/06316* (2013.01); *G06F 3/0484* (2013.01); *G06F 17/30058* (2013.01); *H04N 21/482* (2013.01)

(58) Field of Classification Search
CPC .......... H04N 21/4536; H04N 21/466; H04N 21/482; G06Q 10/06316; G06Q 10/0633; G06Q 10/10; G06F 17/30058; G06F 3/0484
See application file for complete search history.

(56) References Cited

U.S. PATENT DOCUMENTS

| 2002/0120484 A1* | 8/2002 | Bantz et al. ........................ 705/8 |
| 2004/0254956 A1* | 12/2004 | Volk ........................... 707/104.1 |
| 2005/0021348 A1* | 1/2005 | Chan et al. ........................ 705/1 |
| 2006/0200333 A1 | 9/2006 | Dalal et al. ........................ 703/17 |
| 2008/0062870 A1* | 3/2008 | Clower et al. .................. 370/230 |
| 2008/0307464 A1* | 12/2008 | Azera et al. ..................... 725/56 |

OTHER PUBLICATIONS

Cooper, "About Face: The Essentials of User Interface Design," IDG Books Worldwide, Inc., 1995.
Nielsen, "Ten Usability Heuristics," copyright 2005 by Jakob Nielsen, ISSN 1548-5552, http://www.useit.com/papers/heuristic/heuristic_list.html.
"Human-centred design processes for interactive systems," ISO 13407:1999(E), first edition Jun. 1, 1999, copyright ISO.

* cited by examiner

*Primary Examiner* — Xavier Wong
(74) *Attorney, Agent, or Firm* — Zilka-Kotab, PC

(57) ABSTRACT

A system, method, and computer program product are provided for generating channel specific heuristics. In use, at least one channel filter including a characteristic associated with a communications channel is identified. Additionally, the at least one channel filter is applied to at least one design heuristic. Furthermore, at least one channel specific heuristic is generated based on the application of the at least one channel filter to the at least one design heuristic.

6 Claims, 4 Drawing Sheets

US 9,195,961 B1

SYSTEM, METHOD, AND COMPUTER PROGRAM FOR GENERATING CHANNEL SPECIFIC HEURISTICS

FIELD OF THE INVENTION

The present invention relates to heuristics, and more particularly to generating heuristics.

BACKGROUND

A user centered design (UCD) has traditionally been associated with the design of any human-machine interface, where the design is tailored to users and their environments, constraints and needs. In the user experience domain, the human factor necessitates a heuristics approach to problem solving and decision making. Unfortunately, conventional techniques for generating heuristics have exhibited various limitations.

For example, when generating heuristics, developers have generally referenced Nielsen's set of 10 web design heuristics (as disclosed in "Ten Usability Heuristics" by Jakob Nielsen, 2005). However, the UCD and heuristics mentioned above are generic and as such lean towards a one size fits all solution, which results in heuristics that are too high-level to have concrete meaning. Specifically, these heuristics do not take into account any context upon which the heuristic is based. Furthermore, most developers do not have a working knowledge of heuristics, such that most design decisions are based on mental processes and best guessing that invariably leads to refinement through much iteration. There is thus a need for addressing these and/or other issues associated with the prior art.

SUMMARY

A system, method, and computer program product are provided for generating channel specific heuristics. In use, at least one channel filter including a characteristic associated with a communications channel is identified. Additionally, the at least one channel filter is applied to at least one design heuristic. Furthermore, at least one channel specific heuristic is generated based on the application of the at least one channel filter to the at least one design heuristic.

DETAILED DESCRIPTION

Figure 1:
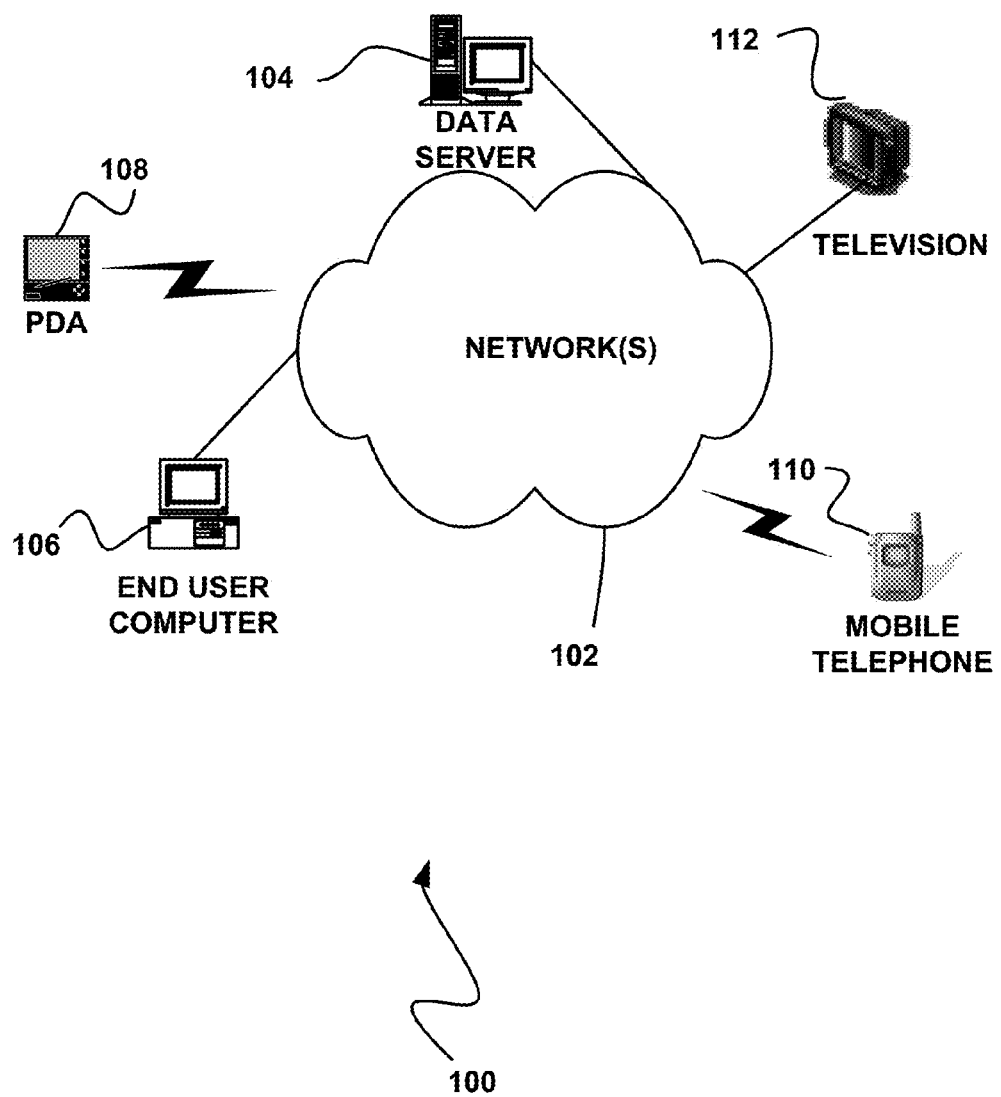
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
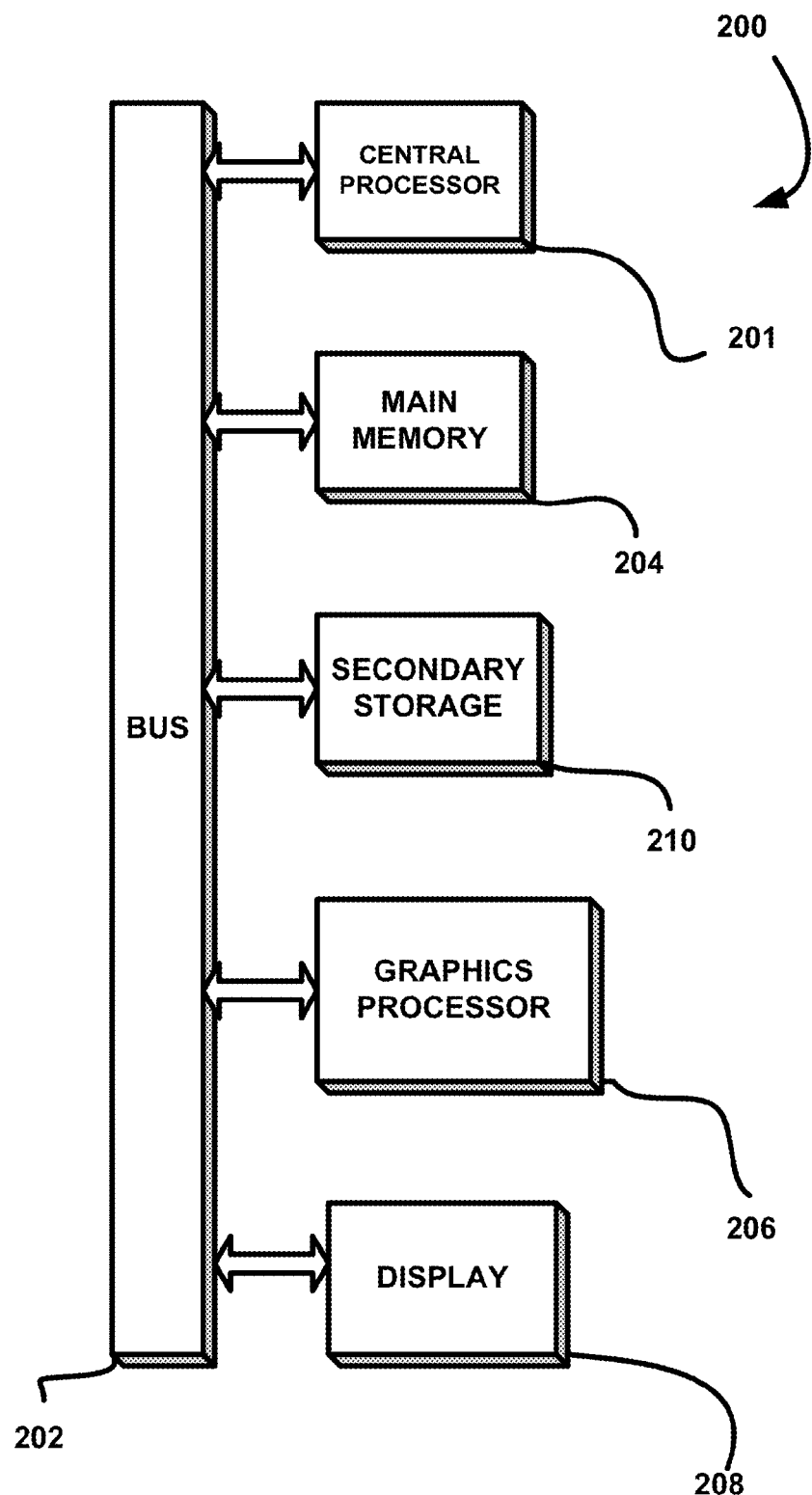
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
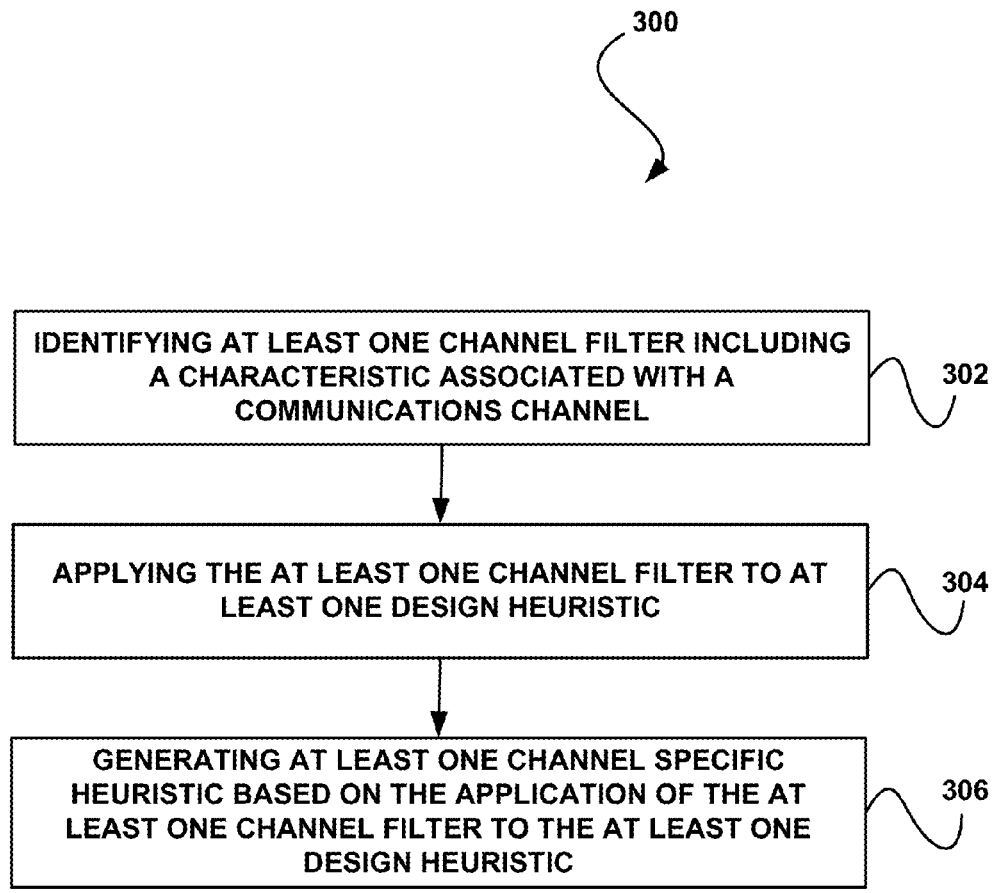
FIG. 3 illustrates a method for generating channel specific heuristics, in accordance with another embodiment.

FIG. 3 illustrates a method 300 for generating channel specific heuristics, in accordance with another embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, at least one channel filter including a characteristic associated with a communications channel is identified. It should be noted that the communications channel may include any channel (e.g. device, service, etc.) allowing communications. In various embodiments, the communication channel may include a mobile device, the Internet, a television, a retail store, a contact center, etc.

Further, the characteristic associated with the communications channel may include any desired aspect associated with the communications channel. In various embodiments, the characteristic associated with the communications channel may include scenarios of use of the communications channel, an operational context of the communications channel, users (e.g. user profiles/personas) of the communications channel, technology utilized by the communications channel, constraints of the communications channel, any attributes of the communications channel, etc.

To this end, in the context of the present embodiment, each channel filter may include a single characteristic associated with the communications channel. Thus, if a plurality of characteristics are associated with the communications channel, a plurality of channel filters, each associated with a different one of the characteristics, may be identified. As an option, the channel filter may only include a characteristic that characterizes the communication channel and differentiates the communications channel from other communications channels.

In one embodiment, the channel filter may be identified based on input of the characteristic associated with the communications channel. For example, the characteristics associated with the communications channel may be the channel filter. In another embodiment, the channel filter may be identified upon selection thereof from a predetermined list of channel filters, each different channel filter including a different of characteristic associated therewith. Optionally, the aforementioned input and/or selection may be received from a user via a graphical user interface.

Additionally, as shown in operation 304, the at least one channel filter is applied to at least one design heuristic. In one embodiment, the design heuristic may include a standard (e.g. a business standard), such as any reference point desired (or optionally required) to be achieved. For example, the design heuristic may include a standard associated with the communications channel.

As an option, the standard may be based on information associated with a user experience from at least one perspective of the user experience. For example, the standard may include that against which the user experience is compared, with respect to each perspective of the user experience. Such perspectives may include a visual perspective, a semantic perspective, a structural perspective, a behavioral perspective, a navigational perspective, etc.

Of course, however, the design heuristic may include any heuristic associated with a design, at least in part based on which a channel specific heuristic may be generated, as described in more detail below. For example, the design heuristic may include past knowledge, experience of a similar problem, a visual representation or model, best practices, simplest explanations, working assumptions, trends and statistics, rules of thumb, etc.

In one embodiment, the design heuristic may be selected from a list of predetermined design heuristics. In another embodiment, the design heuristic may be derived by applying a business filter to a scenario of use. Optionally, the business filter and/or scenario of use may be received as input (e.g. from a user, etc.).

The business filter may include at least one goal (e.g. business drivers) of a business associated with (e.g. providing, etc.) the communications channel. For example, the goal may include a business priority and/or a key performance indicator (e.g. a measurement of the business priority, a measurement of a key success factor, etc.). Just by way of example, the goal (e.g. of a contact center) may include an average handling time, a task completion time, a first call resolution, a reduced learning curve, a increased revenue (upsell/cross-sell), reduced repeat calls, increased user satisfaction, etc. Accordingly, the goal may optionally relate to a reduction in a total cost of ownership, a revenue increase, a satisfaction increase, etc. As another option, the goal may be specific to the communications channel associated with the channel filter.

Also, the scenario of use from which the design heuristic may be partially derived may include a theoretical (e.g. representative) use of the communications channel. Just by way of example, the scenario of use may include a user using the communications channel in a particular manner and/or for a particular purpose. As another example, the scenario of use may include a particular task performed with respect to the communications channel. By deriving the design heuristic from the business filter and the scenario of use, the design heuristic may optionally support business priorities for the scenario of use.

It should be noted that the at least one channel filter may be applied to at least one design heuristic in any desired manner. In one embodiment, each channel filter may be applied to each design heuristic. In another embodiment, the channel filter may be applied to the design heuristic for providing a channel specific heuristic that may be a solution and/or strategy for implementing the subject matter of the design heuristic in a manner that is appropriate with respect to (e.g. works for, etc.) the channel filter.

Furthermore, as shown in operation 306, at least one channel specific heuristic is generated based on the application of the at least one channel filter to the at least one design heuristic. For example, the channel filter may be applied to the design heuristic for filtering the design heuristics based on the characteristics included in the channel filter. In this way, the channel specific heuristic may include a channel filtered design heuristic.

In one embodiment, the channel specific heuristic may include a design strategy associated with the communications channel. In another embodiment, the channel specific heuristic may include a solution associated with the communications channel. Just by way of example, the channel specific heuristic may generated for the scenario of use, goals included in the business filter, and communications channel described above, such that the channel specific heuristic may be utilized for guiding designers towards user experience strategies and solutions in support of the scenario of use, goals included in the business filter, and communications channel. It should be noted that such user experience strategies and solutions may optionally ensure a healthy level of user satisfaction with a system associated with the communications channel by addressing users' needs and requirements while anticipating their actions in the context of their real-world operating environments, in meaningful and intentional ways that meet or surpass their expectations.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
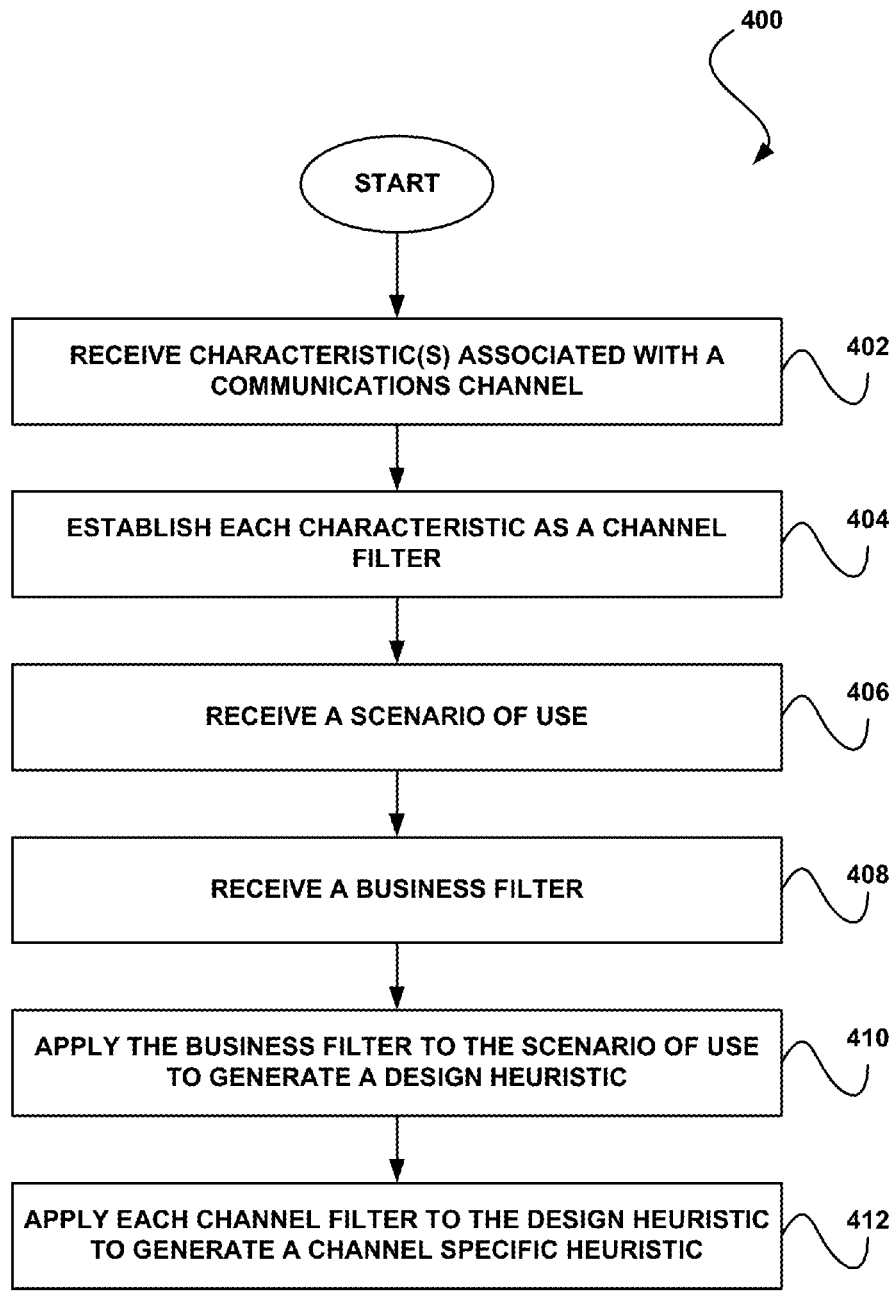
FIG. 4 illustrates a method for generating channel specific heuristics for a scenario of use, a business filter, and a communications channel, in accordance with another embodiment.

FIG. 4 illustrates a method 400 for generating channel specific heuristics for a scenario of use, a business filter, and a communications channel, in accordance with another embodiment. As an option, the method 400 may be carried out in the context of the details of FIGS. 1-3. Of course, however, the method 400 may be carried out in any desired environment. Further, the aforementioned definitions may equally apply to the description below.

As shown in operation 402, at least one characteristic associated with a communications channel are received. Such communication channel may include a mobile device, a television, etc. Also, the characteristic may include, for example, a scenario of use of the communications channel, an operational context of the communications channel, users (e.g. user profiles/personas) of the communications channel, technology utilized by the communications channel, a constraint of the communications channel, an attribute of the communications channel, etc. Optionally, the characteristic may be received from a user via a user interface.

Additionally, the characteristic is established as channel filter. See operation 404. Thus, each channel filter may include a different received characteristic associated with the communications channel. In this way, the channel filter may uniquely characterize the communications channel (e.g. by differentiating the communications channel from other communications channels).

Further, a scenario of use is received, as shown in operation 406. The scenario of use may include a theoretical use of the communications channel characterized by the channel filter. Just by way of example, the scenario of use may include a particular type of use of the communications channel by a user (e.g. a user calling into a call center with a particular request, etc.). Optionally, the scenario of use may be received as input (e.g. from a user).

Still yet, a business filter is received. See operation 408. The business filter may include business priorities and/or key performance indicators associated with the communications channel, a business providing the communications channel, the scenario of use, etc. Thus, the business filter may optionally include goals desired to be achieved with respect to the communications channel, a business providing the communications channel, the scenario of use, etc. In one embodiment, the business filter may be received as input (e.g. from a user). For example, the business filter may be received as a plurality of business priorities and/or key performance indicators, or may optionally be selected from a list of predetermined business filters.

In operation 410, the business filter is applied to the scenario of use to generate a design heuristic. The design heuristic may accordingly include a business standard for the scenario of use that is based on the business filter. For example, the design heuristic may indicate a standard derived from the business filter according to which the scenario of use is to occur. The design heuristic may include standards with respect to a visual perspective, a semantic perspective, a structural perspective, a behavioral perspective, a navigational perspective, and/or any other perspective associated with the scenario of use.

Moreover, as shown in operation 412, each channel filter is applied to the design heuristic to generate a channel specific heuristic. For example, the channel specific heuristic may be derived by analyzing the design heuristic against the channel filter for the scenario of use. In various embodiments, the channel specific heuristic may provide strategies and/or solutions for achieving the design heuristics in the scenario of use. For example, the channel specific heuristic may include an interaction design paradigm and patterns, a design concept, etc.

To this end, the channel specific heuristic may be derived from goals (e.g. of a business) applied to a scenario of use, and filtered by channel specific characteristics. Accordingly, the channel specific heuristic may be provided in a specific context by being a channel-specific, scenario-driven, and business-based heuristic. For example, the channel specific heuristic may include user experience strategies and solutions in support of a specific scenario, business priorities, and channel.

Furthermore, the method 400 may include a visual, structured and guidance-driven process capable of being performed by a machine, such that a developer's mental processes are not necessarily relied upon for generating the channel specific heuristic, thus reducing cognitive load. For example, as an information-driven, process-driven and structured solution, the method 400 may be automated in the form of a software tool that can plug into any development methodologies (e.g. from waterfall to agile).

As an option, the system implementing the method 400 may be flexible and dynamic. For example, new channel specific heuristics may be generated as additional communications channels, scenarios of use, technologies, etc. are identified, such that channel specific heuristics may be generated for each combination of communications channel, business goals, scenarios of use, etc. As another option, the channel specific heuristics may be weighted based on relevance, important, frequency (e.g. of use), etc.

In one exemplary embodiment, a channel filter for a contact center channel may be established. The channel filter may be established using various characteristics associated with the contact center channel (e.g. which are received as input). Table 1 illustrates various examples of characteristics that may be associated with the contact center channel and utilized for establishing the channel filter. Of course, it should be noted that the characteristics shown in Table 1 are set forth for illustrative purposes only, and thus should not be construed as limiting in any manner.

TABLE 1

Desktop Application
Unified/Integrated user interface (unified user experience across multiple systems)
Customer Centric (Agent is 'extension' of customer)
Task-Driven (Customers call in to get something or to get something done)
Professional Users In addition, a scenario of use is input. With respect to the present exemplary embodiment, the scenario of use may include a customer calling in to the contact center and requesting to add global positioning system (GPS) turn-by-turn service to a data plan of a mobile device of the user for $9.99/month, (or as a possible cross-sell, to change the price plan to "unlimited data" for $12.50/month, which includes GPS).

Further, a business filter is established. The business filter may include various goals of the contact center, such as business priorities and key performance indicators. Thus, the goals of the contact center may be received as input and utilized for establishing the business filter. Table 2 illustrates various examples of goals of the contact center that may be utilized for establishing the business filter. Of course, it should be noted that the goals shown in Table 2 are set forth for illustrative purposes only, and thus should not be construed as limiting in any manner.

TABLE 2

| | |
|---|---|
| Average Handling Time (AHT) Reduction | TCO reduction |
| Reduce Learning Curve (and agent churn) | TCO reduction |
| Increase Revenue (upsell/cross-sell) | Revenue increase |
| First Call Resolution (FCR)Reduce Repeat calls (FCR) | TCO reduction |
| Increase User Satisfaction, Etc . . . | Satisfaction Increase |

Design heuristics may then be derived by analyzing the business filter against the scenario of use. For example, it may be determined for various perspectives of the scenario of use (e.g. visual, semantic, structural, behavioral, and navigation) how the contact center can ensure that the AHT in the business filter will be reduced for the scenario of use where the user's data plan is being updated. Table 3 illustrates examples of design heuristics that may be derived by analyzing the business filter against the scenario of use. Again, it should be noted that the design heuristics shown in Table 3 are set forth for illustrative purposes only, and thus should not be construed as limiting in any manner.

TABLE 3

What you see is what you need - when and where you need it
Simple, Direct and Rapid
Intuitive (know what to do by just looking)
Knowledge in the System
System guides user Moreover, channel specific heuristics may be derived by analyzing the design heuristics against the channel filter for the scenario of use. For example, it may be determined how the customer service representative experience can be made customer centric and structured when changing/upgrading the data plan. Such determination may include strategies and/or solutions which are included in the channel specific heuristics.

Table 4 illustrates the derivation of the channel specific heuristics from the scenario of use (shown as scenario), the channel filter (shown as filter), and the design heuristics. Again, it should be noted that the channel specific heuristics shown in Table 4 are set forth for illustrative purposes only, and thus should not be construed as limiting in any manner.

TABLE 4

| Scenario | Filter | Design Heuristic | | Strategy (channel-specific heuristics) |
|---|---|---|---|---|
| change upgrade data plan | customer centric | persistent structure | → | persistence of customer context, customer centric taxonomy |
| | task driven | consistent navigation | → | guided flow, driven by structure |
| | | rapid | → | maximum auto-populate, appropriate defaults, Essential task |
| | | knowledge in system | → | integrated analysis (customer data, usage, history, equipment, etc.) |
| | desktop | intuitive | → | next best action, alerts and indicators |
| | professional user | simple/direct | → | design for the probable case, what you see is what you need |
| | Etc . . . | | | |

In another exemplary embodiment, creation of a user centered design for a mobile device may be desired, assuming it is already known how to design a desktop web application. Both desktop web and mobile web may deal with interaction between a human user and a machine, but while desktop web may deal with the user as an extension of the machine within the machine's environment (desktop), mobile web may deal with the machine as an extension of the user within the user's environment (person).

Initially, characteristics of the new channel (i.e. the mobile design in the present exemplary embodiment) that differentiate such channel from other channels are identified. For example, channel attributes, constraints, operational context, and user profiles/personas may be identified which characterize and differentiate the mobile web channel. The identified characteristics may be aggregated to establish a channel filter, or optionally multiple channel filters may be established, each associated with a different characteristic.

Just by way of example, a characteristic may include a type of content associated with the mobile device, and a first resulting channel filter may include a size. As another example, a characteristic may include capabilities of the mobile device and access networks used by the mobile device, and a second resulting channel filter may include mobility. As yet another example, a characteristic may include a context in which the content may be received by the user, and a third resulting channel filter may include agility. Thus, in the present exemplary embodiment, three channel filters that differentiate mobile web design from desktop web design may be identified (i.e. size, mobility, and agility).

Next, the channel filters are applied to design heuristics thus allowing identification of the importance and priorities of each heuristic within the context of mobile web design (e.g. to establish channel specific heuristics). It should be noted that while business priorities and key performance indicators are not described in the present example, the design heuristics may be derived in support of key performance indicators where relevant and available). Since the design heuristics may include known information that applies to any design, the manner of applying of design heuristics to specific contexts may be desired to be considered.

Thus, the design heuristics may be applied to the channel filters to define the design strategy and paradigms to be included in the channel specific heuristics for use in the mobile web design. For example, the channel specific heuristics may be derived by analyzing the design heuristics against the channel filters for the given scenario of use (i.e. the mobile web design). In various embodiments, the design heuristics may include fostering cross channel transparency, thinking in terms of essential tasks, ensuring content of the mobile web design is relevant, building intelligence into the system, keeping the mobile web design simple, making the mobile web design easy to navigate, optimizing the mobile web design for speed, giving feedback, evaluating and redesign, etc.

Further, as noted above, the channel filters may include size, mobility, and agility, such that the design heuristics may be applied to the channel filters by determining how each design heuristic is affected by size, mobility and agility. Thus, each channel filter may be applied to each design heuristic. Just by way of example, if the channel filters are applied to the design heuristic that includes thinking in terms of essential tasks, the resulting channel specific heuristics may include defining the essential user tasks. Essential user tasks may include the tasks the user is most likely to perform. This may have a higher importance in mobile web than desktop web, where the focus may be on the user interface on the essential tasks while enabling less frequent tasks via other channels.

The resulting channel specific heuristics may also include identifying the most probably scenarios to support mobility and agility. Thus, once the essential tasks are identified, specific flows that are the most probable may be identified. For example, prepaid refill may be essential, but repeated refill with the same credit card and the same amount may be more likely than a different refill pay method and amount each time. By identifying such, the most common refill scenario may be enabled with a single click, thus supporting mobility (e.g. available instantly with no need to have the credit card at hand) and agility (interaction speed, such as a one click transaction).

The resulting channel specific heuristics may further include minimizing data entry to support size and mobility. For example, data entry may be minimized by providing the user with defaults that match previous transactions (e.g. previous refill amount and credit card). This may deal with the challenging input methods related to the small device size and the simplicity of refilling while on the move.

Still yet, the resulting channel specific heuristics may include optimizing forms to support these scenarios to support size and agility. For example, the form may be optimized to support the most probable scenario, while allowing an alternate scenario to be supported from another form. This may addresses the small screen as well as the speed of interaction of the most probable scenarios.

In this way, the unique characteristics of the software channel for which we want to develop the user interface may be identified, thus deriving channel filters. Further, a list of known design heuristics may be identified, such that the channel filters may be applied to each design heuristic one-by-one, thus deriving channel specific heuristics. For example, the channel specific heuristics may include a set of rules and a design strategy that support the user centered design process, which as noted above may be developed in a systematic and methodological manner based on relevant factors that impact design (channel filters, etc.), such that the user centered design process may be validated.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium that embodies a computer program, comprising:
   computer code for identifying a plurality of characteristics associated with a mobile device that differentiate the mobile device from another device, the plurality of characteristics including:
      a type of content associated with the mobile device, and
      a plurality of users of the device;
   computer code for identifying one or more actions performed by a user utilizing the mobile device;
   computer code for identifying a plurality of business goals associated with the mobile device, including a reduction in a total cost of ownership of the mobile device for the user of the mobile device and an increase in satisfaction of the user of the mobile device;
   computer code for applying the plurality of business goals associated with the mobile device to the predetermined use of the mobile device to generate a design heuristic, the design heuristic including a web design to be displayed by the mobile device that achieves the plurality of business goals; and
   computer code for applying each of the identified plurality of characteristics associated with the mobile device to the design heuristic to create a specific heuristic, the specific heuristic including specific tasks to be completed within the strategy for performing web design for the mobile device.

2. The non-transitory computer readable medium that embodies the computer program of claim 1, wherein the plurality of business goals further includes a desired task completion time.

3. The non-transitory computer readable medium that embodies the computer program of claim 1, wherein the plurality of business goals further includes a desired increase in revenue.

4. A method, comprising:
   identifying, by a system including a hardware processor, a plurality of characteristics associated with a mobile device that differentiate the mobile device from another device, the plurality of characteristics including:
      a type of content associated with the mobile device, and
      a plurality of users of the device;
   identifying, by the system, one or more actions performed by a user utilizing the mobile device;
   identifying, by the system, a plurality of business goals associated with the mobile device, including a reduction in a total cost of ownership of the mobile device for the user of the mobile device and an increase in satisfaction of the user of the mobile device;
   applying, by the system, the plurality of business goals associated with the mobile device to the predetermined use of the mobile device to generate a design heuristic, the design heuristic including a web design to be displayed by the mobile device that achieves the plurality of business goals; and
   applying, to the system, each of the identified plurality of characteristics associated with the mobile device to the design heuristic to create a specific heuristic, the specific heuristic including specific tasks to be completed within the strategy for performing web design for the mobile device.

5. A system, comprising:
   a processor for:
      identifying a plurality of characteristics associated with a mobile device that differentiate the mobile device from another device, the plurality of characteristics including:
         a type of content associated with the mobile device, and
         plurality of users of the device;
      identifying one or more actions performed by a user utilizing the mobile device;
      identifying a plurality of business goals associated with the mobile device, including a reduction in a total cost of ownership of the mobile device for the user of the mobile device and an increase in satisfaction of the user of the mobile device;
      applying the plurality of business goals associated with the mobile device to the predetermined use of the mobile device to generate a design heuristic, the design heuristic including a web design to be displayed by the mobile device that achieves the plurality of business goals; and
      applying each of the identified plurality of characteristics associated with the mobile device to the design heuristic to create a specific heuristic, the specific heuristic including specific tasks to be completed within the strategy for performing web design for the mobile device.

6. The system of claim 5, wherein the processor is coupled to memory via a bus.

* * * * *